(12) United States Patent
Lian et al.

(10) Patent No.: US 10,258,216 B2
(45) Date of Patent: *Apr. 16, 2019

(54) SINK-TYPE WASHING MACHINE

(71) Applicant: NINGBO FOTILE KITCHEN WARE CO., LTD, Ningbo (CN)

(72) Inventors: Yangzhong Lian, Cixi (CN); Hui Xu, Cixi (CN); Dengguang Zhu, Cixi (CN); Feng Zheng, Cixi (CN); Shuai Li, Cixi (CN); Zhongqun Mao, Cixi (CN); Yongding Zhu, Cixi (CN)

(73) Assignee: Ningbo Fotile Kitchen Ware Co., Ltd., Ningbo (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/108,243

(22) PCT Filed: Dec. 22, 2014

(86) PCT No.: PCT/CN2014/001154
§ 371 (c)(1),
(2) Date: Jun. 24, 2016

(87) PCT Pub. No.: WO2015/100700
PCT Pub. Date: Jul. 9, 2015

(65) Prior Publication Data
US 2016/0324391 A1    Nov. 10, 2016

(30) Foreign Application Priority Data

Dec. 31, 2013  (CN) .......................... 2013 1 0749864

(51) Int. Cl.
A47L 15/42    (2006.01)
A47L 15/00    (2006.01)
A47J 43/24    (2006.01)

(52) U.S. Cl.
CPC .......... *A47L 15/0086* (2013.01); *A47J 43/24* (2013.01); *A47L 15/4204* (2013.01); *A47L 15/4225* (2013.01)

(58) Field of Classification Search
CPC ............. A47L 15/4204; A47L 15/4225; A47L 15/4206; A47L 15/4208; A47L 15/4221
(Continued)

(56) References Cited

U.S. PATENT DOCUMENTS 3,312,232 A * 4/1967 Jenkins .................. A47L 15/23
134/176
3,709,236 A * 1/1973 Field .................. A47L 15/0086
134/104.4
(Continued)

*Primary Examiner* — David G Cormier
*Assistant Examiner* — Thomas Bucci
(74) *Attorney, Agent, or Firm* — Wang Law Firm, Inc.

(57) ABSTRACT

A sink-type washing machine comprises a case having a sink body; the sink body has a recess at least at the center of the bottom portion; a drain board having a same shape as the recess which is covered on the recess; the drain board has a plurality of drain holes; the recess under the drain board defines into a drain region; the surface of the drain board is flush with the bottom portion of the sink body around the drain board; the water pump is disposed in the drain region for pumping the water in the drain region to above the drain board. By having the water pump arranged in the drain region of the sink body, the water pump is provided with a great water replenishment effect, arrangement of a water outlet component is facilitated, and an improved spraying effect can be acquired.

5 Claims, 4 Drawing Sheets

(58) Field of Classification Search
 USPC ...... 134/56 D, 110, 18, 111, 25.2, 10, 104.2, 134/104.4
 See application file for complete search history.

(56) References Cited

U.S. PATENT DOCUMENTS

| | | | | |
|---|---|---|---|---|
| 5,377,707 | A | * | 1/1995 | Young, Jr. ........... A47L 15/4204 134/104.1 |
| 5,470,142 | A | * | 11/1995 | Sargeant ............. A47L 15/0084 312/258 |
| 5,779,812 | A | * | 7/1998 | Thies .................. A47L 15/4208 134/10 |
| 6,182,674 | B1 | * | 2/2001 | Jozwiak ............. A47L 15/0049 134/104.1 |
| 2003/0205250 | A1 | * | 11/2003 | DeBoer ............... A47L 15/0086 134/57 D |
| 2006/0180185 | A1 | * | 8/2006 | Jeong ................. A47L 15/4204 134/58 D |
| 2010/0037923 | A1 | * | 2/2010 | Dingler ............. A47L 15/4204 134/104.4 |

\* cited by examiner

SINK-TYPE WASHING MACHINE

RELATE APPLICATIONS

This application is a national phase entrance of and claims benefit to PCT Application for a sink-type washing machine, PCT/CN2014/001154, filed on Dec. 22, 2014, which claims benefit to Chinese Patent Applications 201310749864.9, filed on Dec. 31, 2013. The specifications of both applications are incorporated here by this reference.

FIELD OF THE INVENTION

The present invention relates to a washing machine, and in particular to a sink-type washing machine.

DESCRIPTION OF THE PRIOR ART

Dishwasher is a device which sprays cold water or hot water onto dishes to remove dirt on the dishes and washes the dishes. The dishes are placed in a dish shelve inside a dishwasher cabinet. A dishwasher generally includes a pump and a sprayer both for spraying washing water, a heater for generating hot water, and the like. For the existing dishwashers, steam has been used for washing dishes. Compared with the heated water, the use of steam also reduces the time required for washing and improves the efficiency of washing. A disadvantage common to those dishwashers is that a large space is needed. Such dishwashers usually require a standalone casing and dependent components. Accordingly, such dishwashers generally have a large size and are thus not suitable for some families with a large population and a small per-capita living space. Consequently, in many families, the use of dishwashers is less popular.

To save the space, many sink-type washer designs have been proposed. That is, the existing sinks are refitted as washers, and in this case, the sinks are directly used as the washing space. A rotary spray arm is generally provided on the bottom of a sink, and the rotary spray arm is usually connected to a pump driven by a motor. As disclosed in Chinese Patent Application CN101600371A (Application No.: 200880003431.6), titled "Kitchen Sink with a Dishwashing Apparatus, and Water Spray Apparatus Thereof", the water spray apparatus is mounted in a sink basin to spray water for dishes, and the apparatus includes:

a sprayer, the sprayer having drain holes used for spraying pressurized water, supplied by a power supply pump, to wash dishes placed on the bottom of the sink basin by means of a grill;

a fastening means configured to receive the sprayer in a rotating manner in order to mount the sprayer on the bottom of the sink basin;

a rotation driving device configured to operate via the pressurized water supplied by the water supply pump and mounted to rotate the sprayer;

an opening/closing member which moves up and down to, when not in a washing operation, close the drain holes of the sprayer to prevent reflux from the sink basin, and when in a washing operation, open the drain holes of the sprayer; and a lifting device configured to enable the opening/closing member to move up and down.

In such a sink-type washer, both the rotary spray arm and the pump are arranged in the washing region, and the water pump is supplemented with water directly from the washing region, so that the supplemented water is inevitably greasy and/or contains food residues. As a result, the operating efficiency and the service life of the water pump are influenced. On the other hand, with regard to the supplementation of water to the water pump, a certain water level is required. Since the entire bottom of the sink is used as the water supplementation region, the larger the area of the sink bottom is, the larger the amount of water needed for washing is. Since the detergent must be maintained in a certain concentration during the washing, a greater amount of detergent is needed, and as a result, waste is caused and it is not environmentally friendly.

SUMMARY OF THE INVENTION

A first technical problem to be solved by the present invention is, in view of the prior art, to provide a sink-type washing machine which can effectively prevent food residues from entering the water pump during the washing.

A second technical problem to be solved in the present invention is to provide a sink-type washing machine which can effectively reduce the consumption of water for washing without influencing the water supplementation of the water pump.

To solve the first technical problem, the sink-type washing machine comprises, a case having a sink body with a washing space and a bottom portion; wherein, the sink body has a recess at least at center of the bottom portion; the washing machine further comprises a drain board with a surface, the drain board has a same shape as the recess and is covered on the recess, and a water pump; the recess under the drain board forms a drain region; the drain board has a plurality of drain holes for drainage; the surface of the drain board is flush with the bottom portion of the sink body around the drain board; the water pump is disposed in the drain region for pumping the water in the drain region to above the drain board.

To further solve the second technical problem, preferably, the bottom portion of the sink body is a bottom board; the recess is formed only at center of the bottom board, and the recess is formed by the bottom board itself; or the bottom board has a hole at center and a box is disposed under the hole of the bottom board, then the recess is formed by the space in the box. In this way, both the washing water and the detergent are saved effectively. Meanwhile, other components such as an ultrasonic generation device can be provided outside the drain region of the sink body.

To ensure that water enters the water pump evenly from the surrounding, preferably, the drain board is elongated, in oblong or elliptic, and has a center region; and two wing regions on the two sides of center region, the width of the center region of the drain board is greater than that of wing regions.

Preferably, a mounting hole for the water pump to pass through is formed in the center of the center region; the drain board has an annular closed region surrounding the mounting hole, the closed region is sealed without drain holes, so that water has a certain acceleration distance from the drain board to the water pump, and this is helpful for the water pump to form a negative pressure to achieve better water drawing effect.

To increase the water holding capacity of the drain region, there is a short path for water already sprayed from the drain region to return, so that water feeding is more even and it is more beneficial to washing. Preferably, the drain board is is arranged along the diagonal of the bottom portion of the sink body.

To simplify the structure of the water pump and make the manufacturing process of the water pump simple, preferably, the water pump is an open water pump; the water pump comprises an impeller and a guide bracket; the impeller includes a hollow center shaft which is engaged to an output shaft of a motor, and a plurality of blades distributed uniformly on a periphery surface of the shaft, each blade extends along an axis of the shaft; the guide bracket has a lower chamber for accommodating the lower portion of each blade in the center of the guide bracket; and there is a gap between a bottom surface of the guide bracket and the bottom portion of the sink body.

For ease of washing, preferably, the drain board is preferably connected to the guide bracket in such a manner that the top of the guide bracket is exposed out of the drain board from the mounting hole, the guide bracket has an annular flange around the lower chamber, and the drain board surrounding the mounting hole is located on the annular flange.

Compared with the prior art, the present invention has the following advantages:

in the present invention, a drain region is covered by a drain board and arranging the water pump in the drain region, the water pump is isolated from the washing region, so that water flowing back to the water pump is first filtered by the drain board, and the operating efficiency and the service life of the water pump are thus improved;

a recessed drain region is only in the center of the bottom portion of the sink body, the drain region maintains a same water holding capacity regardless of the area of the bottom portion of the sink body, so that both the washing water and the detergent are effectively saved;

by designing the center region of the drain board in a width greater than that of the two sides, it can ensure that the water pump in the center can receive water feeding from all sides evenly, ensuring the water supplementation effect while saving water; and since there is no drain hole on the closed region of the drain board above the water pump, water in this closed region has a certain acceleration distance before reaching the water pump and this is helpful for the water pump to form a negative pressure to achieve better water drawing effect.

DETAILED DESCRIPTION OF THE PREFERRED EMBODIMENT

To enable a further understanding of the present invention content of the invention herein, refer to the detailed description of the invention and the accompanying drawings below:

Embodiment 1

Figure 1:
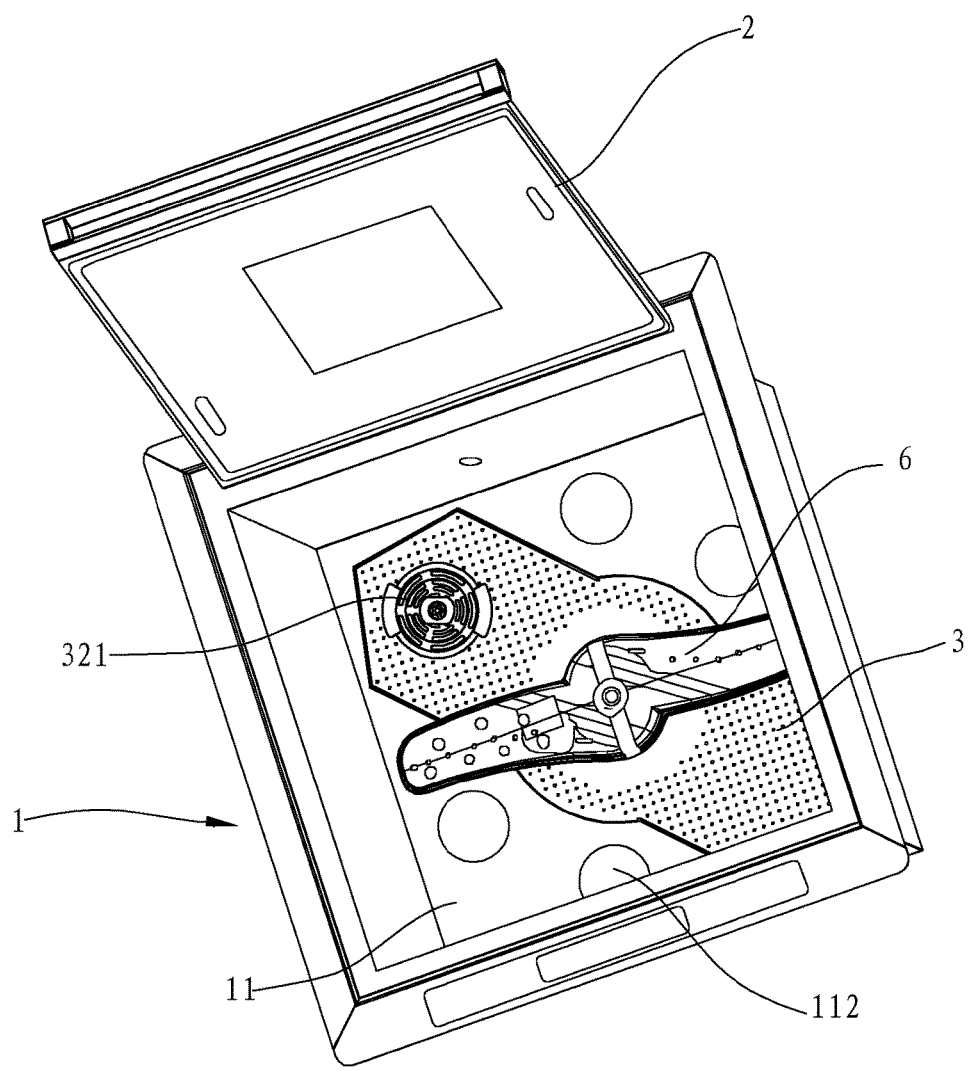
FIG. 1 is perspective view of a sink-type washing machine according to Embodiment 1 of the present invention.
Figure 2:
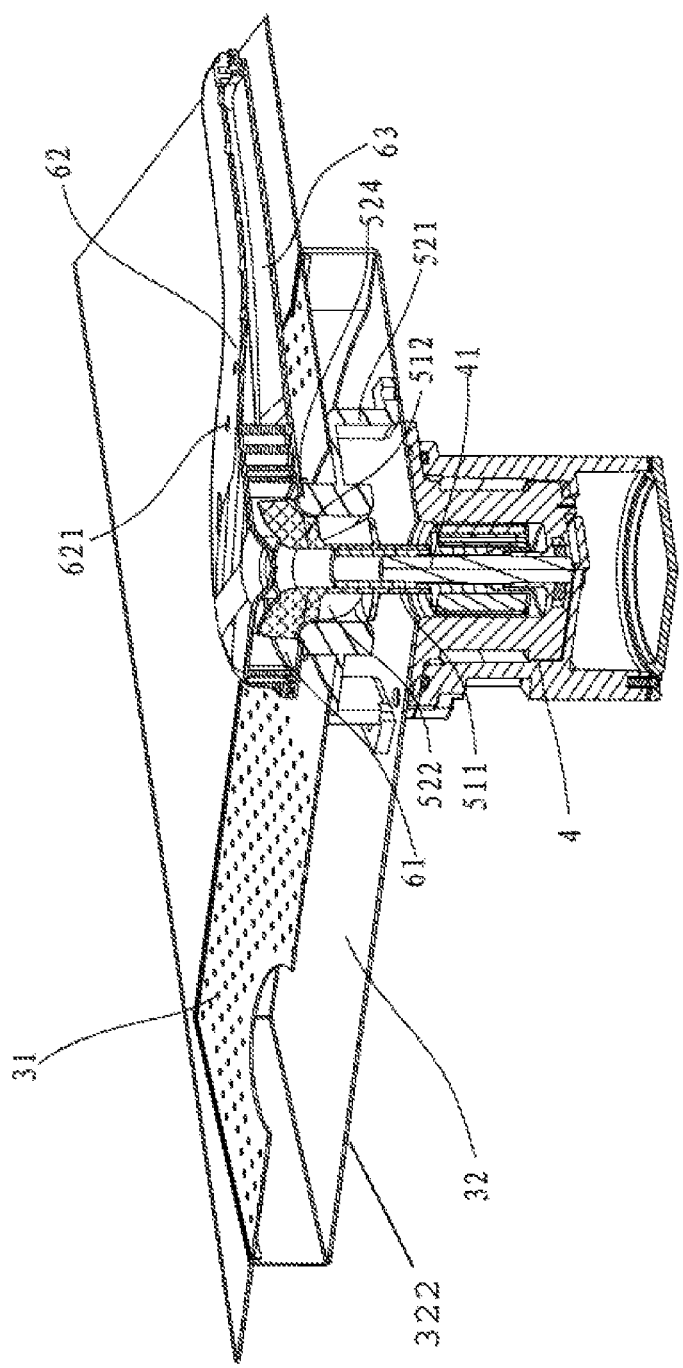
FIG. 2 is a partial sectional view of the sink-type washing machine according to Embodiment 1 of the present invention.
Figure 3:
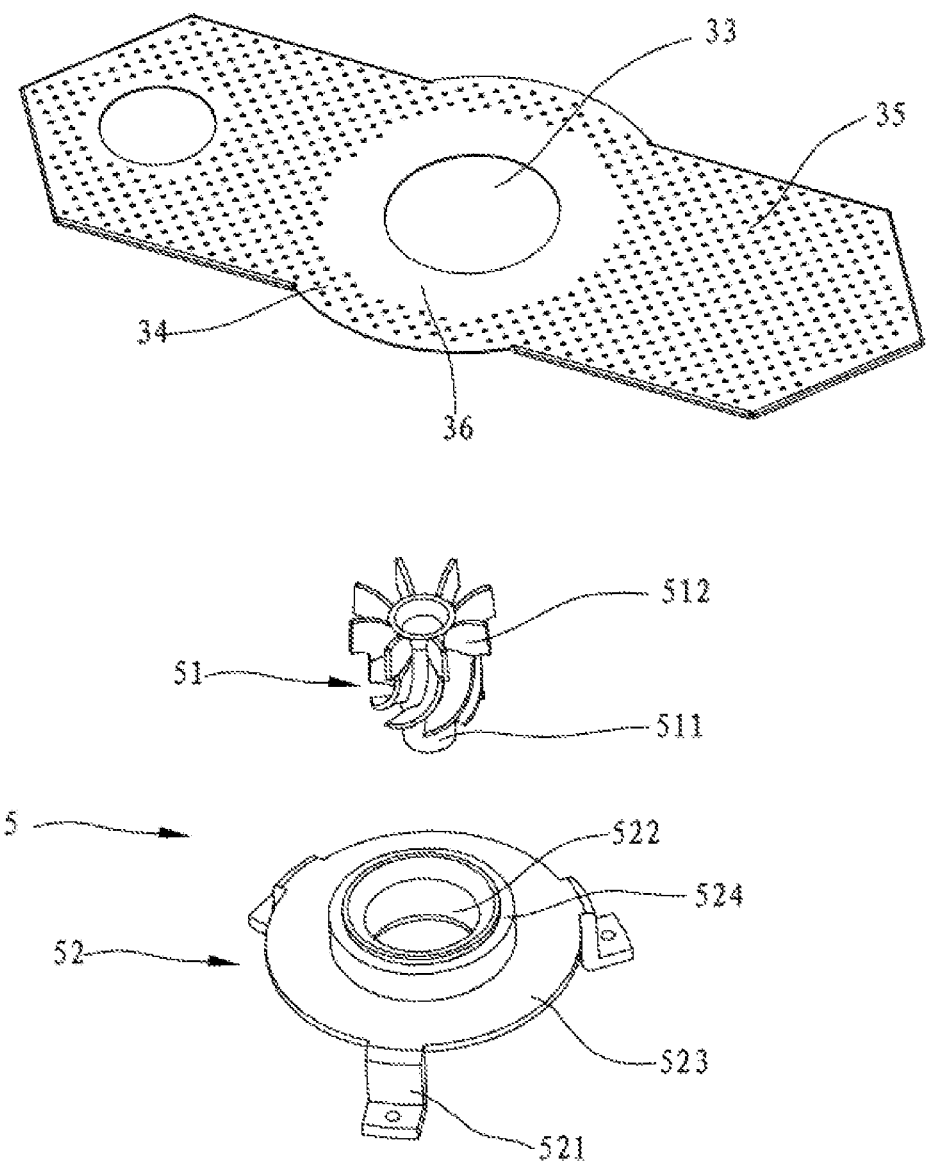
FIG. 3 is a perspective view of a drain board and a water pump according to Embodiment 1 of the present invention.

FIG. 1-FIG. 3 show a preferred embodiment of the sink-type washing machine of the present invention, that is Embodiment 1. The washing machine can be used for washing dishes, vegetables, fruits and the like. The washing machine comprises a sink body 1, and a cover plate 2 rotatably connected to the top of the sink body 1. The sink body 1 can be a common household sink. A washing space is formed between the sink body 1 and the cover plate 2, to accommodate the dishes, vegetables, fruits and the like, for a purpose of washing them.

The sink body 1 has a bottom board 11 and a recess at least at center of the bottom board 11. A drain board 3 having a same shape as the recess is covered over the recess of the bottom board 11, the recess under the drain board 3 forms into a drain region 32. The drain board 3 has a plurality of drain holes 31 for drainage. The surface of the drain board 3 is flush with the bottom board 11 of the sink body 1 around the drain board 3. Alternatively, the drain region 32 can be formed by a box 322, in detail, the bottom board 11 has a hole at the center and a box 322 is disposed under the hole of the bottom board 11, and the drain board 3 is covered above the box 322 and is flush with other portions of the bottom board 11, then the drain region 32 is formed by the space in the box 322. Or, the drain board 3 can have a same shape and size as the bottom board 11, and can be entirely located above and spaced apart from the bottom board 11, then the space between the drain board 3 and the bottom board 11 forms the drain region 32.

On the outside of the sink body 1, a motor 4 is provided below the bottom board 11. An output shaft 41 of the motor 4 is located, after being inserted into the sink body 1, in the drain region 32 above the bottom board 11, or, when a box is used, the output shaft 41 of the motor 4 is inserted into the drain region 32 above the box.

A water pump is provided within the drain region 32 and spatially spaced apart from the washing space above the drain board 3. In this way, water, containing food residues, flowing back into the drain region 32 can be first filtered by the drain board 3, in order to prevent food residues from entering the water pump 5 to block the water pump 5. Thus, both the operating efficiency and the service life of the water pump 5 can be improved. In this embodiment, an open water pump is used. The water pump includes an impeller 51. The impeller 51 includes a hollow shaft 511 in the center and a plurality of blades 512 arranged on the circumferential surface of the shaft 511. The blades 512 are evenly distributed on the circumferential surface of the shaft 511 and extended in an axial direction. A lower end of the shaft 511 is connected to an output shaft 41 of the motor 4, and in this way, the impeller 51 can be driven to rotate when the motor 4 rotates.

A guide bracket 52 is provided outside the impeller 51. A plurality of mounting feet 521 are provided circumferentially on the guide bracket 52. The mounting feet 521 can be fixed to the bottom board 11, the box or the motor 4 by screws or the like. There is a gap between a bottom surface of the guide bracket 52 and a bottom surface of the drain region 32, and water inside the drain region 32 flows through the gap. The lower part of each of the blades 512 is located within a lower chamber 522 formed in the center of the guide bracket 52, and the upper part thereof is exposed to the guide bracket 52.

Preferably, the top of the guide bracket 52 is exposed out of the drain board 3, a mounting hole 33 is formed on the drain board 3 at a position corresponding to the guide bracket 52, and the guide bracket 52 and the upper part of each of the blades 512 pass through the mounting hole 33. Thus, the impeller 51 is located above the drain board 3 to be at least partially exposed to the drain board 3. The guide bracket 52 has an annular flange 523 around the lower chamber 522, the annular flange 523 resisted against a lower surface of the drain board 3. The drain board 3 surrounding the mounting hole 33 is located on the annular flange 523. The guide bracket 52 can also be entirely located within the drain region 32.

The drain region 32 is elongated, with two sides being inclined toward the middle to form a sharp corner at an end thereof. The drain board 3 is arranged along the diagonal of the bottom portion of the sink body 1.

Correspondingly, the drain board 3 has a similar shape to that of the drain region 32. The width of the center region 34 of the drain board 3 is greater than that of wing regions 35 on two sides of the center region 34. The mounting hole 33 is formed in the center of the center region 34; the drain board 3 has an annular closed region 36 surrounding the mounting hole 33, the closed region 36 is sealed without drain holes 31. Since much water is fed from the wing regions 35 on the two sides of the drain board 3, the increased width of the center region 34 can ensure that water enters the impeller 51 evenly from the surrounding.

Due to the arrangement of the closed region 36, the water flow cannot enter the surrounding of the impeller 51 within the drain region 32 directly from the surrounding of the mounting hole 33, and instead, the water flow needs to turn to the periphery of the closed region 36 to enter the drain region 32. In this way, water flowing through the center region 34 of the drain board 3 to the drain region 32 has a certain distance from the impeller 51, so that the water flow has a certain acceleration distance and this is helpful to form a negative pressure to achieve excellent water drawing effect of the impeller 51. As a result, water can be pumped from the drain region 32 smoothly.

A rotary spray arm 6 is supported on the top of the guide bracket 52. The rotary spray arm 6 is located above the drain board 3. An upper chamber 61, for accommodating an upper portion of each of the blades 512, is formed on the bottom of the middle portion of the rotary spray arm 6. The lower chamber 522 of the guide bracket 52, the impeller 51 and the upper chamber 61 form the water pump which is used for pumping water inside the drain region 32 to wash objects to be washed (dishes, vegetables, fruits and the like) by the rotary spray arm 6.

The rotary spray arm 6 includes an upper cover 62 and a lower cover 63, a flow channel communicated to the upper chamber 61 is formed between the upper cover 62 and the lower cover 63, the upper chamber 61 is located in the middle of the rotary spray arm 6, and the flow channel is located on two sides of the upper chamber 61. A plurality of water outlets 621 are formed on an upper surface of the upper cover 62. The water outlets 621 are located above the flow channel and correspond to the flow channel. Water pumped by the water pump enters the flow channel from the upper chamber 61, and is then sprayed from the water outlets 621 to wash the objects to be washed. An upper step surface 524 is provided on the guide bracket 52 at a position above the annular flange 523, and resisted against a lower surface of the rotary spray arm 6. The rotary spray arm 6 is rested on the upper step surface 524.

Alternatively, the water pump can also be a frequently-used water pump of a closed structure. Water inside the drain region 32 is drawn into the closed water pump and then pumped into the rotary spray arm 6 from the water outlets. That is, the rotary spray arm 6 still serves as the water outlet component of the closed water pump.

A residue basket 321 is also provided within the drain region 32, with an upper end thereof penetrating through the drain board 3, for holding residues left after the washing, in order to avoid blocking a water drain pipeline communicated to the residue basket 321. An ultrasonic generator 112 is provided in a portion of the bottom board 11 around the drain board 3.

Figure 4:
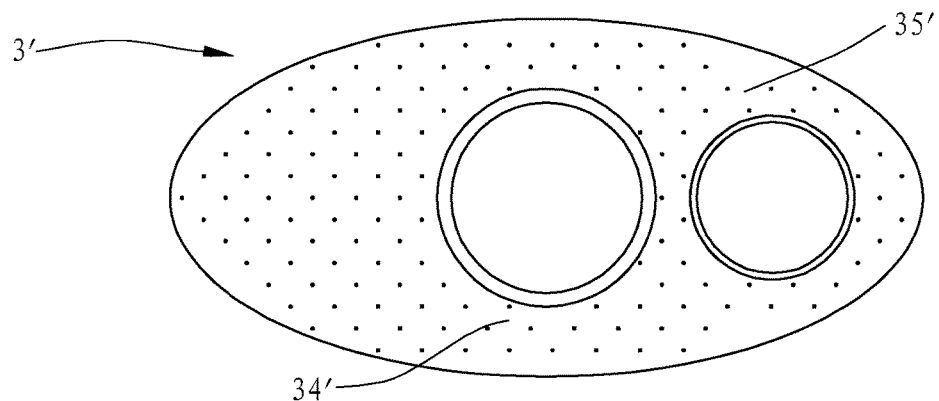
FIG. 4 is a perspective view of a drain board according to Embodiment 2 of the present invention.

FIG. 4 shows another alternative embodiment of the drain board of the sink-type washing machine of the present invention, i.e., Embodiment 2. The difference of this embodiment from Embodiment 1 is that the drain board 3' is elliptic, and also, a width of the center region 34' of the drain board 3' is greater than that of wing regions 35'.

Figure 5:
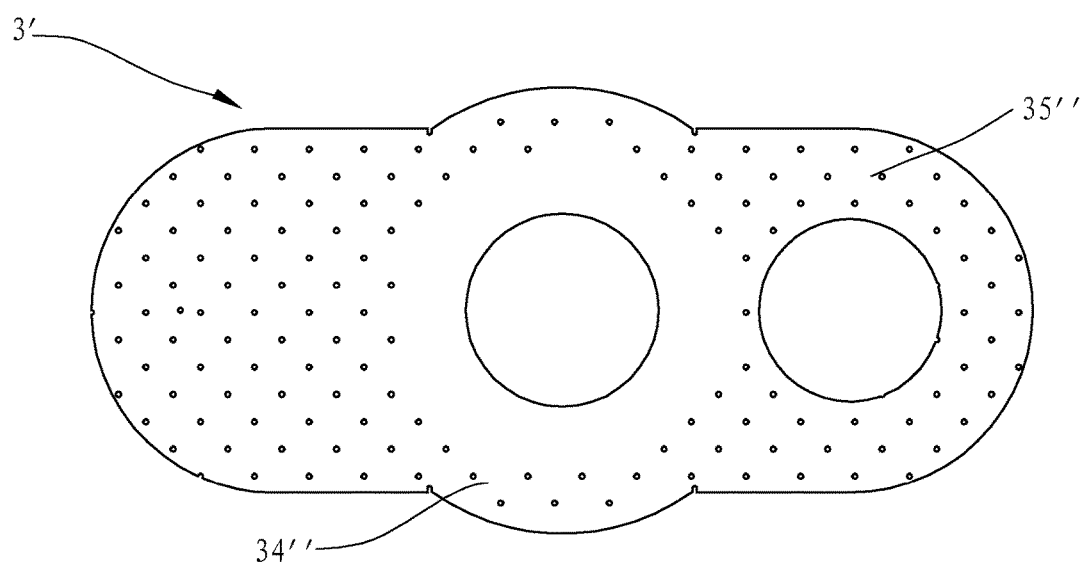
FIG. 5 is a perspective view of a drain board according to Embodiment 3 of the present invention.

FIG. 5 shows another alternative embodiment of the drain board of the sink-type washing machine of the present invention, i.e., Embodiment 3. The difference of this embodiment from Embodiment 1 is that the drain board 3" is elongated, and also, a width of the center region 34" of the drain board 3" is also greater than that of wing regions 35".

The invention claimed is:

1. A sink-type washing machine comprising:
a sink body with a washing space and a bottom portion;
a recess below the bottom portion;
a drain board having a same shape as the recess and covering the recess, the drain board defining a plurality of drain holes for drainage, the drain board having an off-center opening for receiving a residue basket, the residue basket being flush with the drain board;
a drain region formed by the recess under the drain board;
a rotary spray arm disposed above the drain board;
a water pump disposed partially inside the rotary spray arm, the water pump further comprising an impeller with a hollow center shaft and a plurality of blades distributed uniformly on a periphery surface of the shaft, the hollow center shaft is engaged to an output shaft of a motor, each blade having a curvy part and a straight part, the curvy part extending along an axis of the hollow center shaft, and
a guide bracket for receiving the impeller, the guide bracket further comprising a lower chamber for accommodating a lower portion of each blade in a center of the guide bracket;
wherein the drain board is flush with the bottom portion of the sink body around the drain board;
a gap exists between a bottom surface of the guide bracket and the bottom portion of the sink body;
a mounting hole for the water pump to pass through is formed in a center of a center region of the drain board; the drain board has an annular closed region surrounding the mounting hole, the annular closed region is sealed without drain holes.

2. The washing machine of claim 1, wherein, the bottom portion of the sink body is a bottom board;
the recess is formed by the bottom board;
or the bottom board has an opening and a box is disposed under the opening, the recess is formed by a space in the box.

3. The washing machine of claim 1, wherein the drain board is elongated, in oblong or elliptic, and has two wing regions connected to the center region, a width of the center region of the drain board is greater than that of wing regions.

4. The washing machine of claim 3, wherein the drain board is disposed diagonally on the bottom portion of the sink body.

5. The washing machine of claim 1, wherein a top of the guide bracket is exposed out of the drain board from the mounting hole, the guide bracket has an annular flange around the lower chamber, and the drain board surrounding the mounting hole is located on the annular flange.

* * * * *